Feb. 11, 1969 A. L. INGALLS 3,427,105
PLURAL CHANNEL OPTICAL DATA PROCESSOR
Filed June 13, 1961 Sheet 1 of 2

INVENTOR
ARTHUR L. INGALLS
BY
ATTORNEY
AGENT

United States Patent Office 3,427,105
Patented Feb. 11, 1969

---

3,427,105
PLURAL CHANNEL OPTICAL DATA PROCESSOR
Arthur L. Ingalls, Ann Arbor, Mich., assignor to the United States of America as represented by the Secretary of the Air Force
Filed June 13, 1961, Ser. No. 116,895
U.S. Cl. 355—2       5 Claims
Int. Cl. G03b 27/00, 27/32, 27/68

This invention relates to a device for simultaneously processing wave trains in a great number of channels similar to that described in copending application Ser. No. 26,916, Blikken et al., wherein the change of focus with range is corrected by means of light wavelength compensation.

One object of the invention is to provide a device for processing Doppler frequency target information for all ranges simultaneously from information obtained from air-borne coherent side-looking radar which makes unnecessary the use of conical lenses, range function or the tilted slit and cylindrical lens combination for the correction of focus with range.

This and other objects will be more fully understood from the following detailed description taken with the drawing wherein:

FIG. 3 is a three-dimensional view of an optical data processor using light wavelength compensation.

Figure 1:
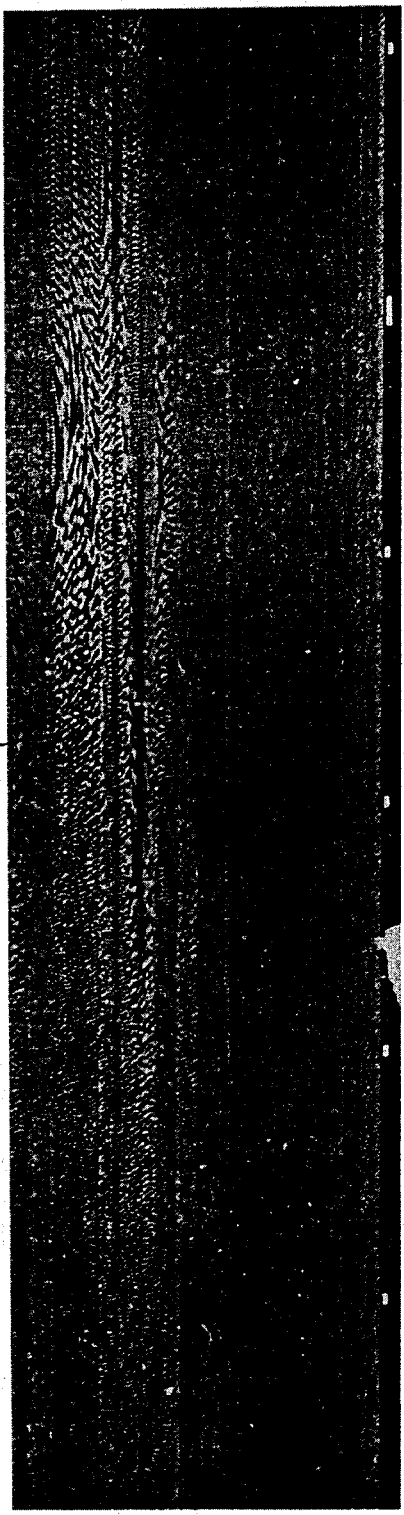
FIG. 1 shows a strip of film containing information from the recording unit of an air-borne coherent side-looking radar.

The radar used to obtain the information on the film shown in FIG. 1 is a coherent radar, that is, it provides phase as well as amplitude information on all received radar signals by comparison with a stable reference oscillator. As the radar is carried along by the aircraft, a radar pulse is transmitted and the amplitude and phase of the returning signals from all targets are stored by recording on film. A short distance later another pulse is transmitted and the return signals are again recorded on the film. Continuing in this fashion the radar phase and amplitude history for each radar illuminated target is obtained over an extended distance of travel of the aircraft. All of the phase information for each target adds up to produce the Doppler history for each target from the time it enters the radar beam until it leaves the radar beam. This information can be used to give an improved resolution in azimuth.

The processing program in azimuth, however, is a function of range so that one needs a large number of computing channels, each having the required computer program for each particular range. The various range increments may then be assigned to the appropriate computer channels. To avoid the construction of many channels, a single channel may be provided to scan all of the required programs sequentially in synchronism with the corresponding data for the different ranges. This system requires a large bandwidth, a scanning system and a data storage system. Either of these systems constructed on an electronic basis will involve a great amount of equipment and therefore a great cost.

The operation of the system of the Blikken et al. application (for a given range) can be described as a cross-correlation of the signal with reference function which is a replica of the expected return from that range, the expected return having a form determined by the geometry of the radar antenna-target relation. Alternatively, the operation of the system can be described in terms of optical properties of the recorded signals. A recorded signal from a radar target is a linearly frequency modulated record, which resembles a diffraction grating with grating spacing varying substantially linearly along its length, of a slice taken through a zone plate. Such structures have focal properties similar to those of a lens, as likewise does the recorded signal. When the signal history brings the impinging light to focus, the resulting image is the high resolution image which is sought. The signals have focal length which is a function of range to the target. The reference function of the Blikken et al. application is, from this viewpoint, a variable focal length lens which has a different focal length for each channel and compensates for the range variation of the signal focal length.

These two viewpoints are equivalent. However, some configurations are best described from one viewpoint, some from the other.

The simplest form of optical data processor consists essentially of a light source, a slit for providing coherent illumination, a collimator, a signal film, a cylindrical lens, a photographic lens, an analyzer slit and a recording film. This simple device can be used only for a very limited range interval due to the change in focus with range. For a more extended range interval, means must be provided to correct for the change in focus.

Figure 2:
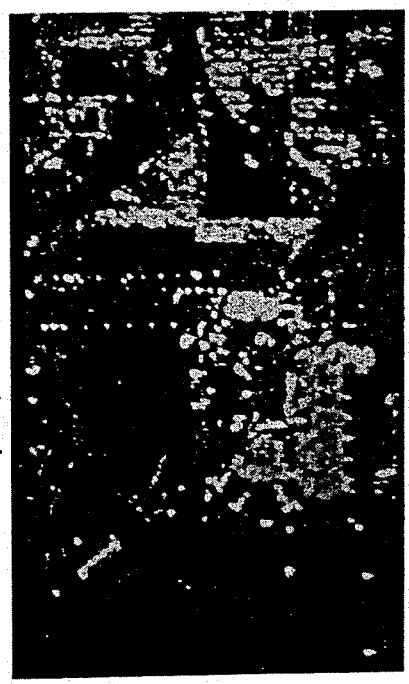
FIG. 2 shows a radar picture including the information obtained from the strip of film shown in FIG. 1.
Figure 2:
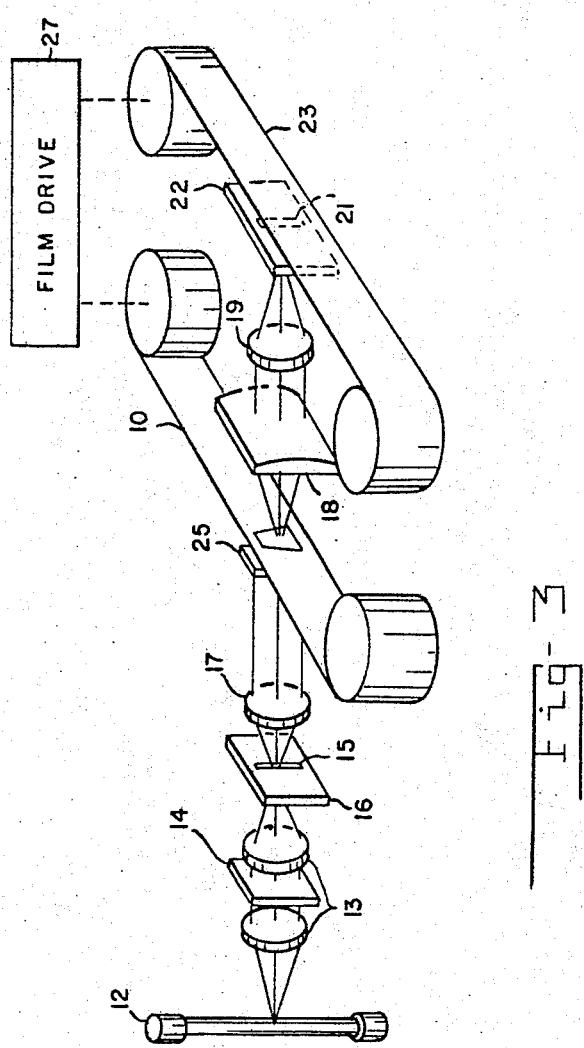

Referring more particularly to FIG. 1 of the drawing, which shows a strip of film 10 having thereon signal histories from many targets indicated at 11. When the information on film 10 is processed in the processor FIG. 3, the radar picture shown in FIG. 2 is obtained with the area corresponding to that shown in FIG. 1 being designated at A.

The signal histories as recorded on the film have focal lengths which vary in proportion to the range in which the target producing the signal originates. The focal length is given by the following:

$$f = \frac{1}{2p^2} \frac{\lambda_R}{\lambda_L} r$$

where $p$ is the scaling factor between distance along the aircraft flight path and distance along the signal film in the direction representing flight path motion
$\lambda_R$ is the wavelength of the radar waves
$\lambda_L$ is the wavelength of light illuminating the signal history
$r$ is the range to the target.

As was stated in the Blikken et al. application, the purpose of the conical lens or reference function is to compensate for the range variation of signal history focal length, thus causing targets from all ranges to come to a focus in a single plane which is normal to the optical system axis.

From the above formula it is evident that the same result would be accomplished if each range element could be illuminated with light of wavelength proportional to the range $r$. Then, the ratio $r/\lambda_L$ would be constant, and the focal length $f$ would become independent of range. Therefore, if a device were introduced into the optical processor which caused the illumination to vary such that $r/\lambda_L$ remained constant, the need for the reference function or the conical lens would be eliminated.

One such device is a wedge interference filter as described in Bausch and Lomb, Inc. Catalog No. D-201, part No. 33-80-02, "Wedge Interference Filter" when illuminated with polychromatic light and placed in front of the signal element will cause each range element to be illuminated with light of a different color.

In FIG. 3 light from a polychromatic linear light source 12 passes through condenser lenses 13 which image the light source on slit 15 in mask 16 and also through a heat-reflecting filter 14 in the same manner as described in the Blikken et al. application referred to above. The light from the slit 15 is collimated by means of a lens 17 and illuminates the signal film 10. The slit 15 is narrow in the azimuth direction and elongated in the range direction of the signal information on signal film 10. The astigmatic lens combination 18 and 19 images the range information from signal film 10 through slit 21 in mask 22 so that the range information is preserved and recorded in focus on the output film 23 as has been described in Blikken et al. application.

In the azimuth direction the collimated light from lens 17 is brought to a distant focus by signal film 10 and this distant image is then brought to a focus on output film 23 by lens 19.

A wedge interference filter 25 is located adjacent the film 10 and together with polychromatic light from source 12 provides illumination of a different wavelength for each range element on signal film 10 and thus provides a correction of focus with range in the manner as described above. While the wedge interference filter has been described as located adjacent signal film 10, it may be located anywhere where the range information is separated, for example, adjacent the output slit 21.

The signal film and the output film are moved through the light source by means of film driving mechanism 27.

The speed of recording film with respect to the speed of the signal film is determined by the ratio of range reduction to azimuth reduction existing on the signal film. If 10,000 yards is shown as 35 mm. in the range direction, this same ratio should exist in the azimuth dimension so that the resulting image will be in proper proportion. However, the two ratios are not necessarily equal on the signal film, where, for example, 10,000 feet in azimuth might be represented as 700 mm., while 10,000 ft. in range might be represented as 35 mm. The equalization of the ratios is made by adjusting the speed ratio between signal film and recording film. For the example stated, the recording film should move 1/20 the speed of the signal film in order to bring the image to proper proportions.

There is thus provided a device for processing wave trains in a great number of channels wherein the change of focus with range is corrected by means of wavelength compensation.

While certain specific embodiments have been described in detail, it is obvious that numerous changes can be made without departing from the general principle and scope of the invention.

I claim:

1. An apparatus for processing a signal film, from an air-borne coherent side-looking radar, having thereon Doppler frequency azimuth target information in a direction along the length of the film and range information across the film, comprising: said signal film means for producing a beam of polychromatic light, means for moving said film through said light in the azimuth direction, a first mask having a slit therein located between said beam producing means and said film, said slit being narrow in the azimuth direction and elongated in the range direction, means located between said mask and said film for collimating the light in the azimuth direction, means including said light producing means for illuminating said film with light of a wavelength proportional to range, a second mask having an output slit therein, output means adjacent said output slit, a first lens for integrating the light information from said signal film in the azimuth direction and for focusing it on said output slit, a second lens which together with said first lens images the range information from said signal film on said output slit.

2. An apparatus for processing a signal film, from an air-borne coherent side-looking radar, having thereon Doppler frequency azimuth target information in a direction along the length of the film and range information across the film, comprising: said signal film means for producing a beam of polychromatic light, means for moving said film through said light in the azimuth direction, a first mask having a slit therein located between said beam producing means and said film, said slit being narrow in the azimuth direction and elongated in the range direction, means located between said mask and said film for collimating the light in the azimuth direction, a wedge interference filter adjacent said signal film, a second mask having an output slit therein, output means adjacent said output slit, a first lens for integrating the light information from said signal film in the azimuth direction and for focusing it on said output slit, a second lens which together with said first lens images the range information from said signal film on said output slit.

3. An apparatus for processing a signal film, from an air-borne coherent side-looking radar, having thereon Doppler frequency azimuth target information in a direction along the length of the film and range information across the film, comprising: said signal film a polychromatic light source, means for moving said film through said light in the azimuth direction, a first mask having a slit therein located between said beam producing means and said film, said slit being narrow in the azimuth direction and elongated in the range direction, means located between said mask and said film for collimating the light in the azimuth direction, a second mask having an output slit therein, an output film adjacent said output slit, a first lens for integrating the light information from said signal film in the azimuth direction and for focusing it on said output slit, a second lens which together with said first lens images the range information from said signal film on said output slit, and means including said light source for illuminating said output with light of a wavelength proportional to range.

4. An apparatus for processing a signal film from an air-borne coherent side-looking radar, having thereon Doppler frequency azimuth target information in a direction along the length of the film and range information across the film, comprising: said signal film means for producing a beam of polychromatic light, means for moving said film through said light in the azimuth direction, a mask having a slit therein located between said beam producing means and said film, said slit being narrow in the azimuth direction and elongated in the range direction, means located between said mask and said film for collimating the light in the azimuth direction, means located adjacent said signal film for providing illumination of a wavelength proportional to range for each range element on said film, a recording film, a mask adjacent said film, said mask having an output slit therein, a first lens for integrating the light information from said signal film in the azimuth direction and for focusing it on said output slit, a second lens which together with said first lens images the range information from said signal film onto said output slit.

5. An apparatus for processing a signal film from an air-borne coherent side-looking radar, having thereon Doppler frequency azimuth target information in a direction along the length of the film and range information across the film, comprising: said signal film means for producing a beam of polychromatic light, means for moving said film through said light in the azimuth direction, a mask having a slit therein located between said beam producing means and said film, said slit being narrow in the azimuth direction and elongated in the range direction, means located between said mask and said film for collimating the light in the azimuth direction, a wedge interference filter adjacent said signal film, a recording film, a mask adjacent said film, said mask having an output slit therein, a first lens for integrating the light information from said signal film in the azimuth direction and for focusing it on said output slit, a second lens which together with said first lens images the range information from said signal film onto said output slit.

References Cited

UNITED STATES PATENTS 2,807,799  9/1957  Rosenthal _____ 88—61 X

VERLIN R. PENDEGRASS, *Primary Examiner.*

U.S. Cl. X.R.

343—17; 350—162; 355—50, 52; 356—5